US008675889B2

(12) United States Patent
Turnbull et al.

(10) Patent No.: US 8,675,889 B2
(45) Date of Patent: Mar. 18, 2014

(54) TWO WIRE AUTOBIAS VEHICULAR MICROPHONE SYSTEM HAVING USER INPUT FUNCTIONALITY AND METHOD OF FORMING SAME

(75) Inventors: Robert R. Turnbull, Holland, MI (US); Alan R. Watson, Buchanan, MI (US)

(73) Assignee: Gentex Corporation, Zeeland, MI (US)

( * ) Notice: Subject to any disclaimer, the term of this patent is extended or adjusted under 35 U.S.C. 154(b) by 444 days.

(21) Appl. No.: 13/003,929

(22) PCT Filed: Jul. 20, 2009

(86) PCT No.: PCT/US2009/051151

§ 371 (c)(1),
(2), (4) Date: Jan. 13, 2011

(87) PCT Pub. No.: WO2010/021803

PCT Pub. Date: Feb. 25, 2010

(65) Prior Publication Data

US 2011/0123041 A1 May 26, 2011

Related U.S. Application Data

(60) Provisional application No. 61/081,790, filed on Aug. 21, 2008.

(51) Int. Cl.
*H04B 1/00* (2006.01)

(52) U.S. Cl.
USPC ................ 381/86; 381/95; 381/121; 381/123

(58) Field of Classification Search
USPC ........................................................... 381/95
See application file for complete search history.

(56) References Cited

U.S. PATENT DOCUMENTS

| | | | | |
|---|---|---|---|---|
| 3,927,383 | A | 12/1975 | Fjarlie et al. | |
| 4,709,360 | A | 11/1987 | Martin et al. | |
| 5,229,721 | A * | 7/1993 | Stade | 330/265 |
| 5,548,810 | A * | 8/1996 | Riddell et al. | 455/99 |
| 6,784,708 | B1 | 8/2004 | Krenzke | |
| 6,970,752 | B1 * | 11/2005 | Lim et al. | 700/94 |
| 7,468,652 | B2 * | 12/2008 | DeLine et al. | 340/425.5 |
| 8,243,956 | B2 * | 8/2012 | Turnbull | 381/95 |
| 8,284,950 | B2 * | 10/2012 | Riggs | 381/86 |
| 2002/0071578 | A1 | 6/2002 | Van Der Zwan et al. | |
| 2007/0069807 | A1 * | 3/2007 | Ho | 327/541 |
| 2007/0109064 | A1 | 5/2007 | Micko | |
| 2008/0084246 | A1 * | 4/2008 | Galal | 330/290 |
| 2008/0310655 | A1 * | 12/2008 | Holzmann | 381/122 |

FOREIGN PATENT DOCUMENTS

| | | |
|---|---|---|
| WO | 2005077029 | 8/2005 |

* cited by examiner

*Primary Examiner* — Davetta W Goins
*Assistant Examiner* — James Mooney
(74) *Attorney, Agent, or Firm* — Price Heneveld LLP; Scott P. Ryan

(57) ABSTRACT

An autobias vehicular microphone system (300) includes a microphone (301) which uses an amplifier (306) for amplifying an output of the microphone. A first feedback path (308) provides an amplifier output signal to the amplifier input for providing amplifier linearity, and a second feedback path (305) is used for providing bias to a voltage reference (303). The voltage reference (303) operates to provide an autobias to the amplifier (306) based upon amplifier load-ing. By holding the bias point to a constant voltage, a constant clip level can be maintained depending on varying load conditions of electronic devices (307, 309, 311) using the microphone (301). Additionally, one or more switches can be used to vary the bias point which can be interpreted to control functionality of the electronic devices (307, 309, 311).

34 Claims, 4 Drawing Sheets

TWO WIRE AUTOBIAS VEHICULAR MICROPHONE SYSTEM HAVING USER INPUT FUNCTIONALITY AND METHOD OF FORMING SAME

CROSS-REFERENCE TO RELATED APPLICATION

This application claims benefit to U.S. provisional application Ser. No. 61/081,790, filed Aug. 21, 2008, entitled TWO WIRE AUTOBIAS VEHICULAR MICROPHONE SYSTEM HAVING USER INPUT FUNCTIONALITY AND METHOD OF FORMING SAME, the entire contents of which are incorporated herein in their entirety.

FIELD OF THE INVENTION

The present invention relates generally to vehicular microphones and more particularly to microphones used with multiple electronic devices in a vehicle.

BACKGROUND

Microphones are commonly used in vehicular applications for a variety of purposes. In some applications the microphone is used for cellular telephones, vehicle navigation, safety, and voice recognition systems. A typical prior art microphone system 100 is depicted in FIG. 1, wherein a microphone transducer 101 feeds a gain or amplifier 103 and provides an amplified audio output 105 for an electronic device. One drawback of typical German Association of the Automotive Industry (VDA) microphone vehicular systems occurs when one microphone is used to drive multiple electronic devices. Prior art FIG. 2 illustrates a microphone transducer system 200 where the microphone 201 is connected to the amplification state 203 and then to multiple electronic devices 205, 207, 209 in the vehicle. Those skilled in the art will recognize that the bias point of the microphone will not remain constant when driving multiple devices. Typically, electric microphone systems require that the bias remain at a fixed value (typically half the supply voltage), which is approximately 4-Volt direct current (VDC) in a VDA system, while the VDA standard dictates an 8-Volt supply voltage and 820 Ohm pull-up resistance for the vehicular microphone. Therefore, paralleling multiple VDA supplies into the microphone 201 will reduce the load resistance which will alter the amplifier bias point. This will ultimately cause a greater degree of clipping and/or other distortion products in the audio from the microphone 201, which is input into one or more electronic devices attached thereto. Prior VDA microphone systems have had to accept reduced performance when connected to multiple loads/inputs or resort to elaborate switching systems to connect the microphone to only one active electronic device input at a time. Moreover, these VDA microphone systems offer no ability for user functionality such that may be actuated by button presses or the like.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
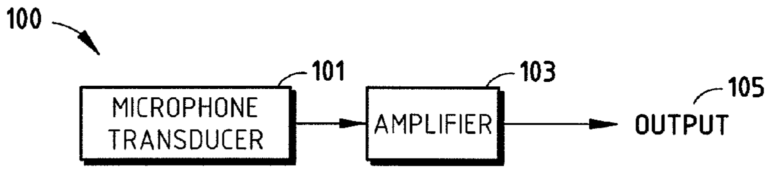
FIG. 1 (PRIOR ART)
FIG. 1 is a prior art block diagram of a typical microphone transducer system using an amplifier stage.
Figure 2:
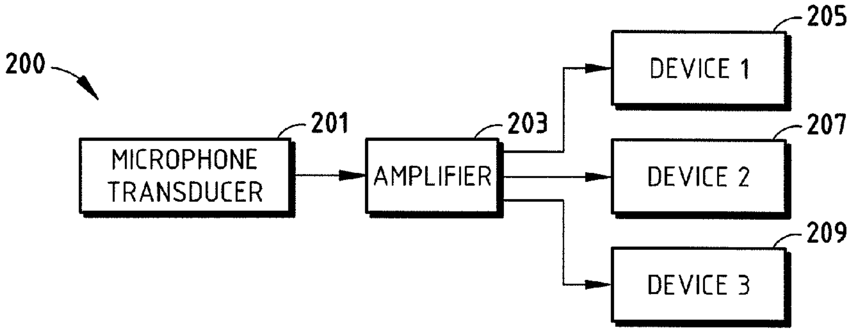
FIG. 2 (PRIOR ART)
FIG. 2 is a prior art block diagram of the microphone transducer system as in FIG. 1 where one microphone is used with a plurality of electronic devices.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an auto bias microphone system for use with multiple loads. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by “comprises . . . a” does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of an auto bias microphone system for use with multiple loads as described herein. The non-processor circuits may include, but are not limited to, signal drivers, clock circuits, power source circuits, and user input devices. As such, these functions may be interpreted as steps of a method to perform an autobias microphone system for use with multiple loads. Alternatively, some or all functions could be implemented by a state machine that has no stored program instructions or, in one or more application, specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 3:
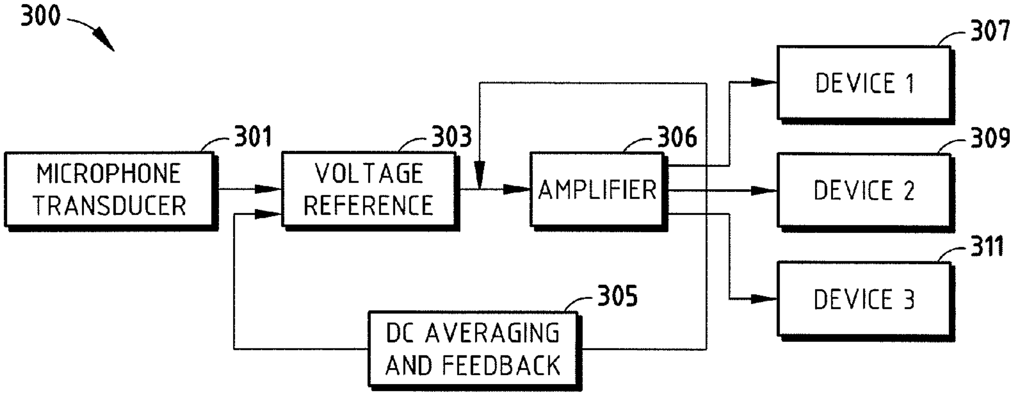
FIG. 3 is a block diagram which illustrates use of a microphone transducer system using DC feedback and averaging.

FIG. 3 illustrates a block diagram of an embodiment of an auto bias microphone system 300 for use with multiple loads. A microphone transducer 301 operates to supply an audio output to a voltage reference stage 303. The voltage reference stage 303 is a programmable voltage reference integrated circuit (IC) that includes an intrinsic offset voltage for setting an average DC output level. Those skilled in the art will recognize that the voltage reference stage 303 uses a three-terminal programmable shunt regulator diode (not shown). This device operates as a low-temperature, coefficient Zener diode which is programmable from $V_{ref}$ to some predetermined voltage with two external resistors. This device may exhibit a wide operating current range typically from 100 μA to 20 mA with a typical dynamic impedance less than ½ ohm (Ω). The characteristics of this type of voltage reference make the device an excellent replacement for a Zener diode or bipolar transistor $V_{BE}$ in autobias microphone applications. The offset voltage makes it convenient to obtain a stable reference when used with either a positive or negative voltage reference. A direct current (DC) feedback and averaging stage 305 provides negative feedback from the output of the voltage reference stage 303 to an input of the voltage reference stage 303. As described with regard to FIG. 3A, a transistor may be used in place of the programmable shunt regulator if lower DC operating point accuracy is acceptable.

An audio amplifier 306 is connected to the output of the voltage reference stage 303 to amplify the output of the microphone transducer 301. Those skilled in the art will also recognize that the audio amplifier 306 utilizes alternating current (AC) feedback to maintain amplifier linearity. A plurality of electronic devices 307, 309, 311 are connected to the output of the audio amplifier 306. Through the use of DC feedback and averaging, the invention operates to allow one transducer or microphone that might be located in a vehicle mirror or other convenient location in a vehicle. In an alternative embodiment, the voltage reference stage 303 can also be used as an audio gain stage for reduction in overall parts count to reduce cost.

Figure 3A:
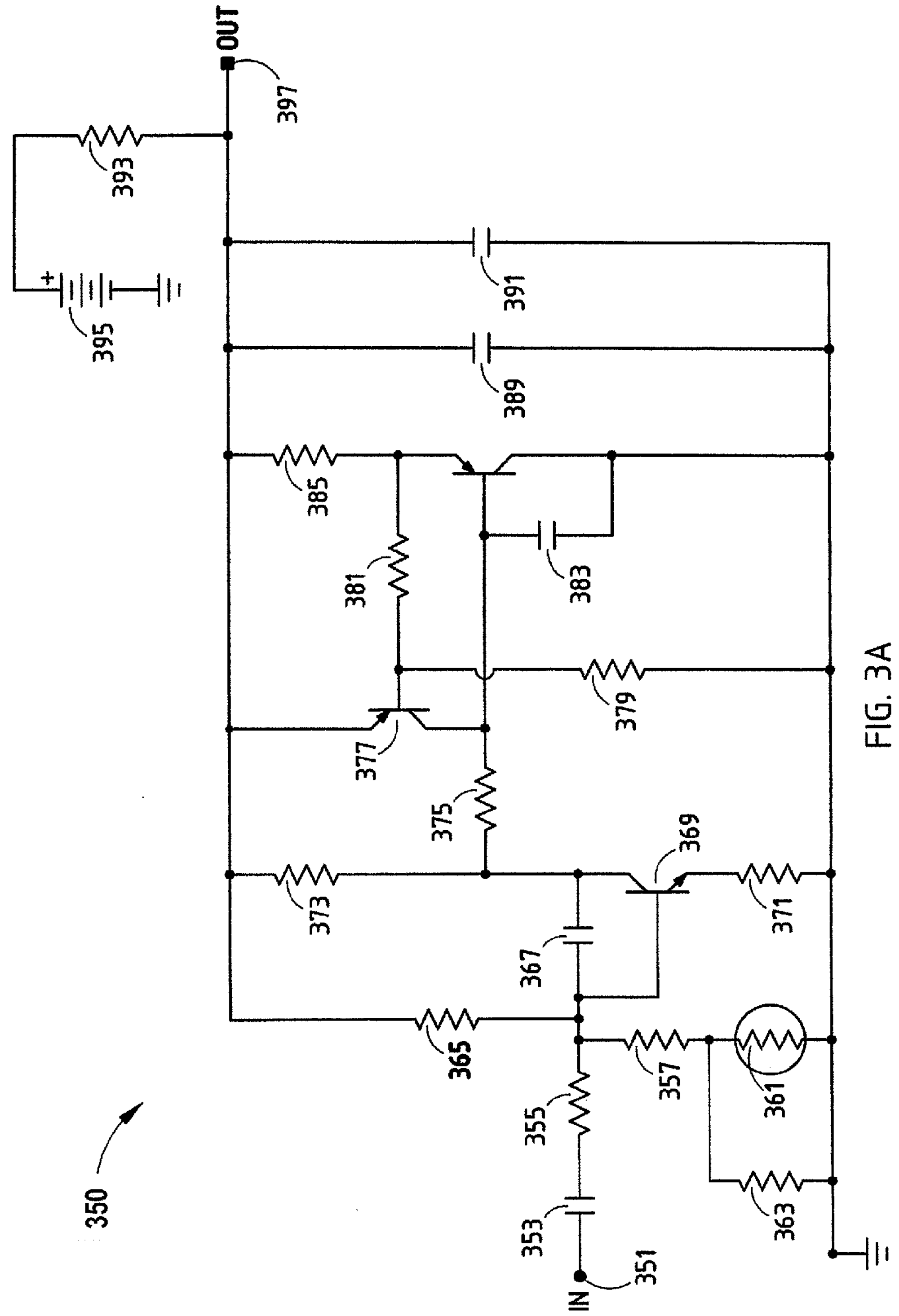
FIG. 3A is a circuit diagram for providing two-wire autobias to a microphone transducer system as shown in FIG. 3.

FIG. 3A is a circuit diagram for providing two-wire autobias to a vehicular microphone system as shown in FIG. 3. The two-wire autobias circuit 350 includes an input 351 that uses a capacitor 353 that couples an AC or audio component of the input signal from the microphone transducer (not shown) while blocking any DC signal component to transistor 369. Resistor 355 and resistor 365 operate to set the amount of gain for the entire output stage. The “gain” is approximately resistor 365/resistor 355. Transistor 369 is a driver transistor and provides a DC voltage reference with its base emitter voltage ($V_{BE}$) and also provides a predetermined amount of loop gain. Resistors 365, 357, 363 and thermistor 361 scale output voltage to the $V_{BE}$ of transistor 369 to set the DC operating point of the output stage. Resistors 363 and 357 also linearize the temperature versus resistance characteristic of the resistors 363 and 357 and the NTC-thermistor 361 network to better match the $V_{BE}$ temperature coefficient of transistor 369 to produce a relatively temperature independent DC operating point. Resistor 371 stabilizes the loop gain and also improves DC operating point stability. Capacitor 307 is used to control loop bandwidth and reduce susceptibility to RF energy. Resistor 373 is used to set the nominal quiescent collector current of transistor 369. Resistor 375 limits the collector current of transistor 369 when protection transistor 377 is in a conducting state. Transistor 377 and resistors 379, 381 and 385 form a safe operating area (SOA) protection circuit for transistor 387. Output driver transistor 387 provides loop gain and sinks current to drive the VDA interface line. Capacitor 383 controls loop bandwidth and reduces susceptibility to RF energy. Capacitors 389 and 391 operate to reduce susceptibility to RF energy to an output 397. Those skilled in the art will recognize that the values of capacitor 389, 391 are staggered to provide RF suppression over a wider bandwidth than can be provided with a single capacitor. A biasing network is comprised of resistor 393 and the voltage source 395 for providing a bias voltage to the two-wire autobias circuit 350.

In order to improve the stability of the DC operating point of the two-wire autobias circuit 350, a temperature dependent semiconductor device such as a transistor junction, diode or thermistor 361 may be used in the bias network of transistor 387. The SOA protection circuit is comprised of transistor 377, resistor 379, resistor 381 and resistor 385 and may also be included for protecting the microphone output stage from inadvertent shorts to the vehicle power bus. In operation, this circuit monitors the current through the emitter and the voltage across the emitter and collector of transistor 377. The value of resistor 385 is chosen so that as the current through the emitter of transistor 377 approaches the limit of the SOA, transistor 377 will turn to an “on” state for preventing further increases in emitter current of transistor 387. The current limit is also proportional to the voltage between the emitter and collector of transistor 387 due to resistor 379. The current through resistor 379 is proportional to the voltage between the emitter and collector of transistor 387. This current adds to the current through resistor 381 which is proportional to the emitter current of transistor 387. This results in a decreased current limit when larger voltages are present between the emitter and collector of transistor 387. This combination of voltage and current monitoring prevents excessive power dissipation in transistor 387 during fault conditions such as shorts to the vehicle power bus.

Figure 4:
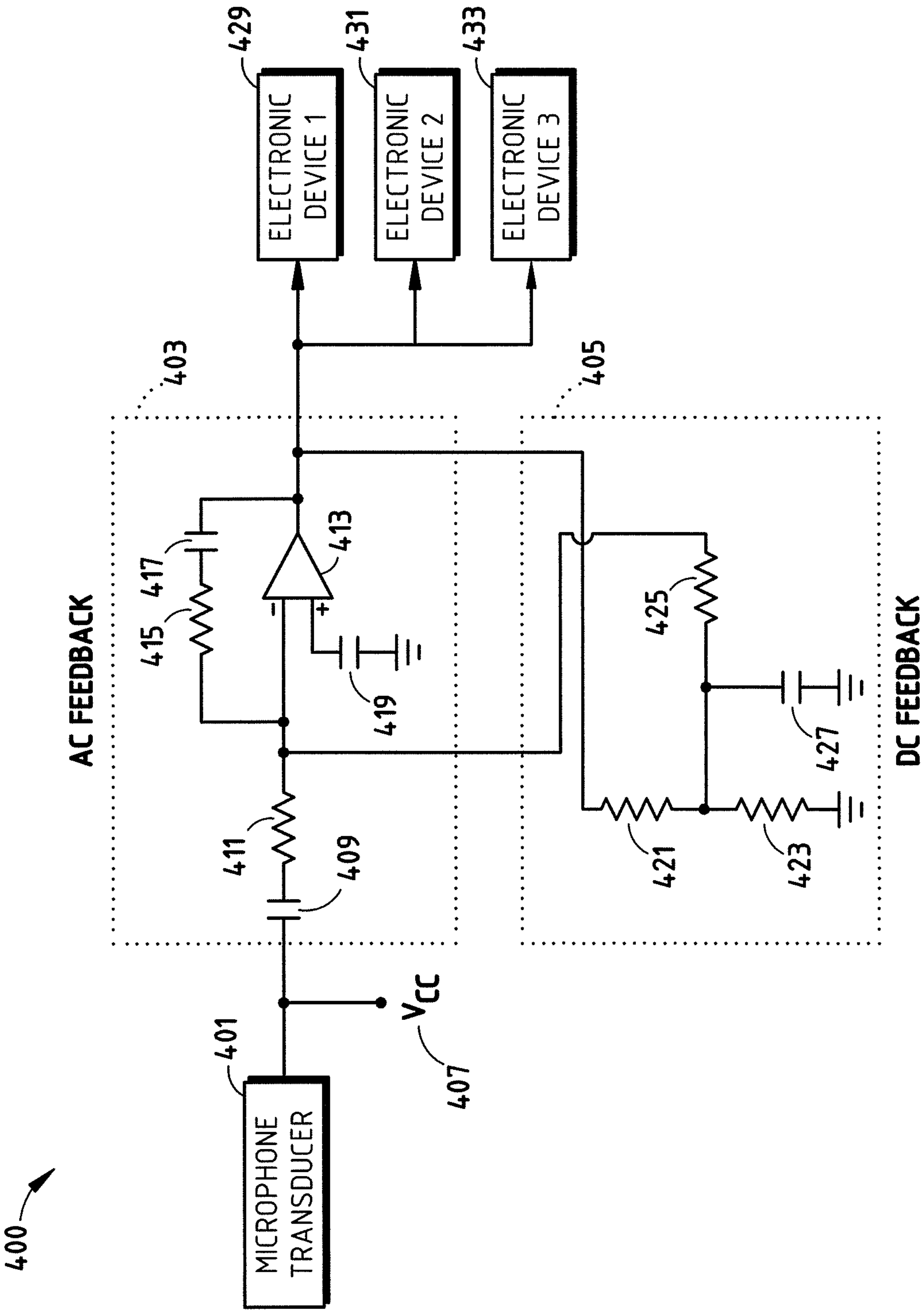
FIG. 4 is a block diagram illustrating an embodiment of that shown in FIG. 3.

FIG. 4 illustrates a block diagram of one specific embodiment of an improved microphone system 400 where the voltage reference and audio gain stage work as one component. As noted in FIG. 3, a microphone transducer 401 is supplied with a supply voltage 407 and provides an audio output of a user voice at some predetermined output level. An audio amplifier 403 is used to increase the signal amplitude from microphone transducer 401. The audio amplifier 403 includes a coupling network including a coupling capacitor 409 and a resistor 411 which supply the correct audio input voltage to a voltage reference/amplifier 413. Those skilled in the art will recognize that the voltage reference/amplifier 413 might be a voltage reference combined with an operational amplifier such as a TLV431 made by Texas Instruments, Inc., a CAT102 made by Catalyst Semiconductor, Inc., or the like, that works to control both the bias and amplify the audio supplied to its input in a linear manner. In order to control the amount of gain of the voltage reference/amplifier 413, a negative feedback loop is used consisting of a resistor 415 and capacitor 417 that couples a predetermined amount of audio or alternating current (AC) feedback from the output of the amplifier 413 to its negative input (−). The positive input (+) of the amplifier 413 generally requires an operating voltage of at least 0.6 Volt DC 419 whose negative node is coupled to ground. Capacitors 417 and 427 may optionally be replaced with a short circuits to simplify the feedback network. In this case resistor 425 is used to set the DC bias point and resistors 421 and 423 may also be omitted.

In order to further control the bias point of the voltage reference/amplifier 413 to electronic devices 429, 431, and 433, a direct current (DC) feedback loop 405 is also used from the output of the amplifier 413 to its negative input (−). The DC feedback loop 405 includes a voltage divider consisting of resistors 421, 423 that receives an output voltage from the amplifier 413 and reduce it to a predetermined value. Those skilled in the art will further recognize that under a VDA standard, the voltage divider would typically reduce a 4 Volt DC voltage to 0.6 Volt DC. An isolation resistor 425 is used to isolate an averaging capacitor 427 to average the voltage to a specified value. Thus, the DC feedback loop works as an average voltage sensing circuit operating to center the voltage reference/amplifier 413 to an operating point near one-half its supply voltage. This allows the bias point to vary for maintaining a constant clip level depending on varying load conditions of electronic devices 429-433 using the microphone transducer 401.

Figure 5:
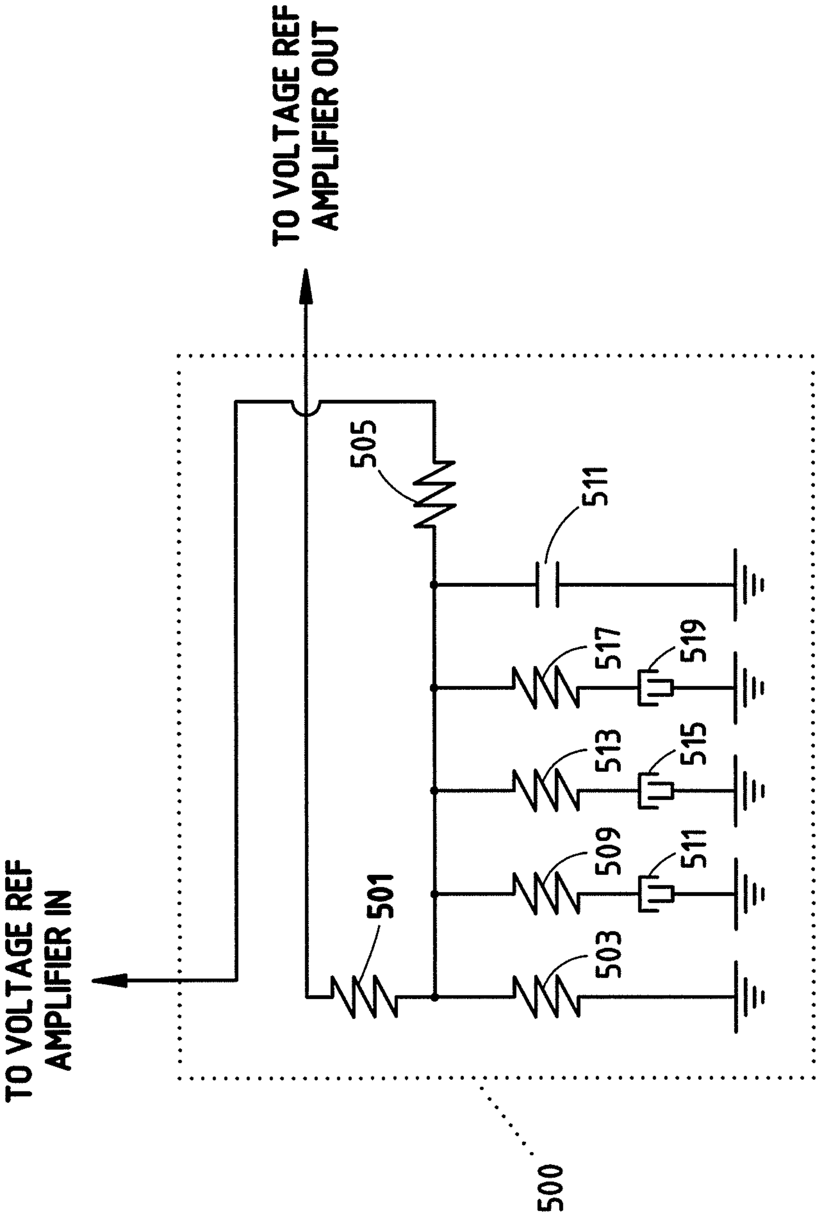
FIG. 5 is a block diagram illustrating an alternative embodiment of the invention to that shown in FIG. 4 which includes user input functionality.

FIG. 5 is a block diagram illustrating an alternative embodiment of the invention to that shown in FIG. 4 which includes user input functionality. In an alternative embodiment to the direct current (DC) feedback loop 405, the DC feedback loop 500 may also be used from the output of the amplifier 413 to its negative input (−). The DC feedback loop 500 includes a voltage divider consisting of resistors 501, 503 that receives an output voltage from the amplifier 413 and reduces it to a predetermined value. Like the DC feedback loop described herein, the voltage divider would typically reduce a 4 Volt DC voltage to 0.6 Volt DC voltage. An isolation resistor 505 may be used to isolate the averaging capacitor 507 to average the voltage to a specified value. In order to provide user input functionality, one or more resistors and switches may be used in combination with the voltage divider to alter the DC feedback to the amplifier 413. For example, resistor 509 and switch 511 are arranged in series in order to provide a parallel resistor combination with resistor 503 in the voltage divider. Similarly, resistor 513 and switch 515 and resistor 517 and switch 519, where each of the resistors 513 and 517 have different values, offer a parallel resistance to the resistor 503 in order to alter the DC gain of an amplifier like that shown in FIG. 4. Those skilled in the art will recognize that this same principle could also be used with resistor 501 as it would also provide the same effect of changing the overall value of the divider.

In operation, one of the switches 511, 515, and 519 can be used in connection with an emergency, eCall, 911 or other service function that works in combination with a cellular telephone or on-board navigation device (not shown). The other switches may be used to call for assistance when the vehicle is disabled or used as a concierge function to ask an operator for assistance in obtaining direction to a location or finding specific a residence or business. As noted herein, the DC feedback loop 500 works as an average voltage sensing circuit operating to center a voltage reference/amplifier to an operating point near one-half its supply voltage. When the value of the voltage divider 503, 509 is changed based upon a switch press, this works to swing the voltage $V_{out}$ higher or lower by some predetermined amount. The average magnitude of the voltage $V_{out}$ can thus be interpreted by a microcontroller or components acting as an error amplifier as the appropriate switch press. This altered bias point is substantially independent of temperature, resistive loading, power supply voltage, and other electronic devices using the microphone transducer as shown in FIG. 4.

It will also be evident that the voltage level may also be detected by using a short term shift in the nominal bias point. This approach may be useful when using a low accuracy voltage reference such as a transistor $V_{BE}$. As an example, a switch press from switches 511, 515, 519 could be detected whenever the bias voltage decreases by more than 1V for more than 100 ms from the average bias voltage over the preceding 30 seconds. Alternatively, opening or shorting the microphone is also possible as a signaling method but is less desirable since the audio signal may be interrupted during the button press. Since automotive microphones are typically monitored for faults by measuring the bias voltage, techniques using opening or shorting may not be a preferred solution. Accordingly, this invention allows for the addition of a switch function without additional vehicle hardware.

The microphone's clip level will vary depending on which button is pressed. If the bias variations are kept small, the microphone will continue to function with only a small reduction in undistorted signal swing during the duration of the button press. Capacitor 427 limits the rate of change of the output voltage when a button is pressed. This serves to reduce clicks or transients in the microphone's audio output when a button is pressed or released.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. An autobias vehicular microphone system comprising:

at least one microphone;

an amplifier connected to the at least one microphone for amplifying an output of the at least one microphone;

a first feedback path providing an amplifier output signal to the amplifier input for providing amplifier linearity; and a second feedback path for providing bias to a voltage reference, wherein at least one switch is connected to the second feedback path for altering the voltage reference; and wherein the alteration of the voltage reference is interpreted as an actuation of the at least one switch for controlling an electronic device used with the at least one microphone.

2. An autobias vehicular microphone system as in claim 1, wherein the bias voltage across the microphone is substantially constant and independent of load resistance and temperature.

3. An autobias vehicular microphone system as in claim 1, wherein the microphone output stage is protected from shorts to the vehicle power bus.

4. An autobias vehicular microphone system as in claim 1, wherein the first feedback path is an audio feedback path.

5. An autobias vehicular microphone system as in claim 1, wherein the second feedback path is a direct current (DC) feedback path.

6. An autobias vehicular microphone system as in claim 1, wherein the second feedback path utilizes at least one voltage divider.

7. An autobias vehicular microphone system as in claim 6, wherein the at least one switch is connected to alter the resistance of the at least one voltage divider.

8. An autobias vehicular microphone system as in claim 1, wherein the at least one microphone is located in a rearview mirror.

9. An autobias vehicular microphone system as in claim 1, wherein the at least one switch controls an emergency function associated with the electronic device.

10. An autobias vehicular microphone system as in claim 1, wherein the at least one switch controls a concierge function associated with the electronic device.

11. An autobias vehicular microphone system as in claim 1, wherein the voltage reference is varied both above and below a predetermined voltage reference.

12. An autobias microphone system for use in a vehicular mirror comprising:

at least one microphone for producing an audio output;

an amplifier for increasing the amplitude of the audio output;

an audio feedback path for providing feedback from an output of the amplifier to an input of the amplifier for providing amplifier linearity; and a direct current (DC) feedback path for providing a dynamic bias to a voltage reference for adjusting the dynamic bias to the amplifier depending on the number of electronic devices using the at least one microphone, wherein at least one switch is connected to the second feedback path for altering the voltage reference and providing user input functionality; and wherein the alteration of the voltage reference is interpreted as an actuation of the at least one switch for controlling functions of the electronic devices used with the at least one microphone.

13. An autobias microphone system as in claim 12, wherein the bias voltage across the microphone is substantially constant and independent of load resistance and temperature.

14. An autobias microphone system as in claim 12, wherein the microphone output stage is protected from shorts to the vehicle power bus.

15. An autobias microphone system as in claim 12, wherein the electronic devices include at least a cellular telephone.

16. An autobias microphone system as in claim 15, wherein the at least one switch operates an emergency function associated with the cellular telephone.

17. An autobias microphone system as in claim 15, wherein the at least one switch operates a concierge function associated with the cellular telephone.

18. An autobias microphone system as in claim 12, wherein the electronic devices include at least a navigation system.

19. An autobias microphone system as in claim 12, wherein the DC feedback path utilizes at least one voltage divider.

20. An autobias microphone system as in claim 19, wherein the at least one switch is used to change the resistance of the at least one voltage divider.

21. An autobias microphone system as in claim 12, wherein the DC feedback path utilizes at least one averaging capacitor.

22. An autobias microphone system as in claim 12, wherein the voltage reference is varied both above and below a predetermined voltage.

23. A method for providing autobias to an automotive microphone system comprising the steps of:

producing an audio output using at least one microphone;

increasing the output of the audio output using an amplifier;

providing an output of the amplifier to an input of the amplifier using an alternating current (AC) feedback from an amplifier output to an amplifier input for providing amplifier stability; and providing a dynamic bias to a voltage reference using a direct current (DC) feedback path, providing at least one switch connected to the DC feedback path for alternating the voltage reference;

altering the voltage reference by actuating the at least one switch; and interpreting a change in the voltage reference for controlling functionality of an electronic device used with the at least one microphone.

24. A method for providing autobias to an automotive microphone system as in claim 23, wherein the bias voltage across the microphone is substantially constant and independent of load resistance and temperature.

25. A method for providing autobias to an automotive microphone system as in claim 23, wherein the microphone output stage is protected from shorts to the vehicle power bus.

26. A method for providing autobias to an automotive microphone system as in claim 23, further comprising the step of:

utilizing a cellular telephone as the at least one electronic device.

27. A method for providing autobias to an automotive microphone system as in claim 26, further comprising the step of:

operating an emergency function associated with the cellular telephone using the at least one switch.

28. A method for providing autobias to an automotive microphone system as in claim 26, further comprising the step of:

operating a concierge function associated with the cellular telephone using the at least one switch.

29. A method for providing autobias to an automotive microphone system as in claim 23, further comprising the step of:

utilizing a navigation system as the at least one electronic device.

30. A method for providing autobias to an automotive microphone system as in claim 23, further comprising the step of:

utilizing at least one voltage divider in the DC feedback path.

31. A method for providing autobias to an automotive microphone system as in claim 30, further comprising the step of:

altering the resistance of the at least one voltage divider with the at least one switch.

32. A method for providing autobias to an automotive microphone system as in claim 23, further comprising the step of:

providing at least one averaging capacitor in the DC feedback path.

33. A method for providing autobias to an automotive microphone system as in claim 23, further comprising the step of:

providing the AC feedback path to a negative input of the amplifier.

34. A method for providing autobias to an automotive microphone system as in claim 23, further comprising the step of:

altering the voltage reference such that the reference voltage swings above a below a predetermined voltage value.

* * * * *